United States Patent [19]

Eriksson

[11] 4,397,009

[45] Aug. 2, 1983

[54] DEVICE FOR LOCATING A DESIRED INFORMATION TRACK

[75] Inventor: Lars O. Eriksson, Norrkoping, Sweden

[73] Assignee: U.S. Philips Corporation, New York, N.Y.

[21] Appl. No.: 205,857

[22] Filed: Nov. 12, 1980

[30] Foreign Application Priority Data

Jun. 6, 1980 [NL] Netherlands .......................... 8003305

[51] Int. Cl.³ .............................................. G11B 21/08
[52] U.S. Cl. ................................... 369/32; 369/33;
369/44; 360/72.1; 360/78
[58] Field of Search ..................... 360/72.2, 74.1, 74.4,
360/78, 106; 365/234, 215; 369/32, 33, 43, 44,
220, 111, 30; 358/128.5, 128.6, 342

[56] References Cited

U.S. PATENT DOCUMENTS

| Re. 29,963 | 4/1979 | Janssen | 358/128.6 |
| 3,854,015 | 12/1974 | Janssen | 358/128.5 |
| 4,037,252 | 7/1977 | Janssen | 369/46 |
| 4,138,663 | 2/1979 | Lehureau | 365/234 |
| 4,190,860 | 2/1980 | Somers | 369/44 |
| 4,330,880 | 5/1982 | Dijk | 369/44 |

FOREIGN PATENT DOCUMENTS 1499268 1/1968 United Kingdom .................. 360/75

OTHER PUBLICATIONS

Neves aus der Fechnik, p. 2, Dec., 1978.

Primary Examiner—Alan Faber
Attorney, Agent, or Firm—Thomas A. Briody; Robert T. Mayer; Algy Tamoshunas

[57] ABSTRACT

A device for locating a desired information track on an information carrier, after an information transducer has been passed over the information tracks on the carrier in the transverse direction in response to a starting pulse, which utilizes a control signal that is derived from the alternating voltage thus obtained, to keep the relative velocity of the transducer relative to the information tracks constant.

9 Claims, 4 Drawing Figures

DEVICE FOR LOCATING A DESIRED INFORMATION TRACK

The invention relates to a device for locating a desired information track on a carrier with adjacent information tracks, which device is provided with a transducer for converting the information in the tracks into electrical form (reading), and with control means for controlling the position of the transducer relative to the carrier in a direction transverse of the direction of the information tracks, whilst moreover deviations in a transverse direction of the transducer position relative to a track to be read are minimized. Examples of such devices are inter alia described in U.S. Pat. No. 3,854,015, U.S. Pat. No. Re. 29,963 and Neues aus der Technik of Dec. 15, 1978, page 2, which examples specifically relate to apparatus for information which is recorded on a rotary disk in an optically readable code. In such apparatus the transducer can generally be moved along the disk by means of a linear motor, whilst a movable mirror ensures that a light spot which scans the disk remains accurately coincident with a desired track on the disk. Hence, said linear motor may be regarded as the coarse control, whilst said mirror may be regarded as the fine control of said control means for controlling the position of the transducer relative to the carrier, as discussed. Generally, fine control by means of a mirror is not required in the case of a "Compact Disk" discussed below.

The invention deals with the problem of rapidly locating a desired track on an information carrier, specifically a rotary disk provided with an optically readable coding. Such disks are referred to in the literature as "VLP" (in which case a single circular track on the disk for example contains a complete television picture) and as "Compact Disk" (which generally contains many short music programs or, in general, audio information with a playing time of only a few minutes, separated by short pauses).

Especially in the last-mentioned case locating a specific passage of audio information presents a problem, because in practice the short pause between two information units represents only a moderate number (for example 10 to 20) of adjacent tracks. In the case of an intertrack spacing of 1 to 2 μm this means that there is such a small spacing between the end of the one and the beginning of the next information unit, that it is impracticable to set the transducer correctly at the beginning of the information unit solely by mechanical means.

Although this problem is preponderant in the case of the "Compact Disk", it will be evident that in the case of "VLP", when locating separate film frames separated by short pauses, similar problems may also occur. Such problems may also occur if the signals are not stored in an optically readable coding, but are instead for example, magnetically coded on the information carrier, for example a magnetic tape or disk, such problems may occur.

It is the object of the invention to provide a solution to this problem, which is first of all intended for the "Compact Disk" but which, as will be apparent from the further description, is equally applicable to "VLP" and carriers provided with, for example, magnetically readable information.

The invention is characterized in that, in a manner known per se, a starting pulse is applied to the control means in order to move the transducer over the tracks in a transverse direction, so that an alternating signal is obtained for controlling the control means with a frequency which depends on the relative transverse velocity of the transducer with respect to the tracks, that a zero passage of said alternating signal starts a timing circuit, which compares an instant that occurs a given time after said zero passage with that of a subsequent zero passage of said alternating signal, from which comparison a control voltage for the control means is derived in order to obtain a constant transverse velocity of the transducer relative to the information tracks, and that finally, just before a desired track is reached, a braking pulse is applied to the control means so as to enable locking-in to the desired track.

The invention is based on the following considerations:

By applying the starting pulse the transducer is moved transversely relative to the information carrier. It is known per se to apply such a small starting pulse and stop pulse so that the transducer jumps from one track to an adjacent track or at the most skips one or two tracks. The transducer is then braked, after which the control mechanism becomes operative again in order to counteract positional deviations between the transducer and the track then reached.

However, if a larger number of tracks, for example between 5 and 100 is to be skipped, as stated in the foregoing, the information carrier will already have moved over some distance relative to the transducer before the transducer has reached the desired new track (the disk has rotated through a specific angle in the case of "VLP" and "Compact Disk").

Since the distance between the tracks is not exactly constant and the tracks do not extend exactly perpendicularly to the transducer motion (e.g. in the case of a disk the tracks are not exactly spiral-shaped with a constant pitch and may moreover be eccentric relative to the centre of rotation of the disk), the control loop constituted by said control means should have such a large control range in order to suppress positional deviations between the transducer and the new track to be located, that this becomes impracticable.

The steps in accordance with the invention ensures that the transducer has a constant relative velocity with respect to each of the tracks passed by it, so that after the appearance of the stop pulse the requirements imposed on the control loop are not more stringent than for normal tracking.

The invention will now be described in more detail with reference to the drawing.

FIG. 1 represents a known tracking device for optically coded information carriers.

FIG. 2, consisting of a–i, represents voltages as a function of the positional deviation of the optical transducer relative to the information carrier.

Figure 1:
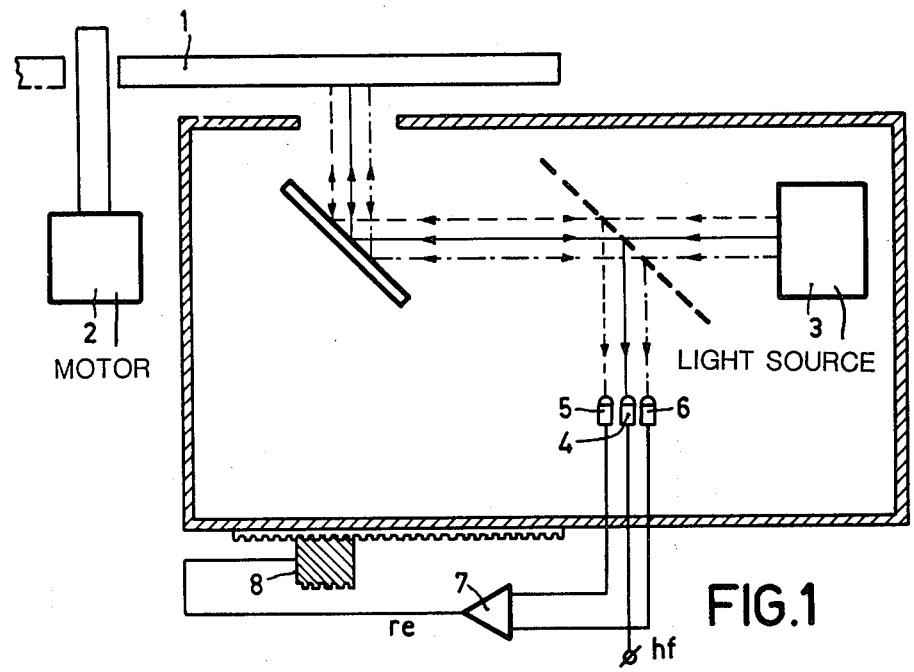

In FIG. 1 the numeral 1 represents a disk-shaped carrier, which is provided with optically readable information. Examples of such carriers are known by the names of "VLP" (for pulse frequency modulated video information) and "Compact Disk" (for digitized audio information). The carrier 1 is rotated by means of a motor 2, so that an information track on the carrier moves past an optical transducer for reading said information. Examples of such transducers are comprehensively described inter alia in U.S. Pat. No. 4,037,252 and the literature cited therein. They are all based on the principle of scanning the carrier 1 by means of a light source 3, so that by means of light-sensitive detectors 4, 5, 6 electric signals are produced, which respectively correspond to the information on the carrier 1 (detector 4) and to deviations of the scanning spot relative to the information track in the one (detector 5) and in the other sense (detector 6) respectively.

Figure 2:
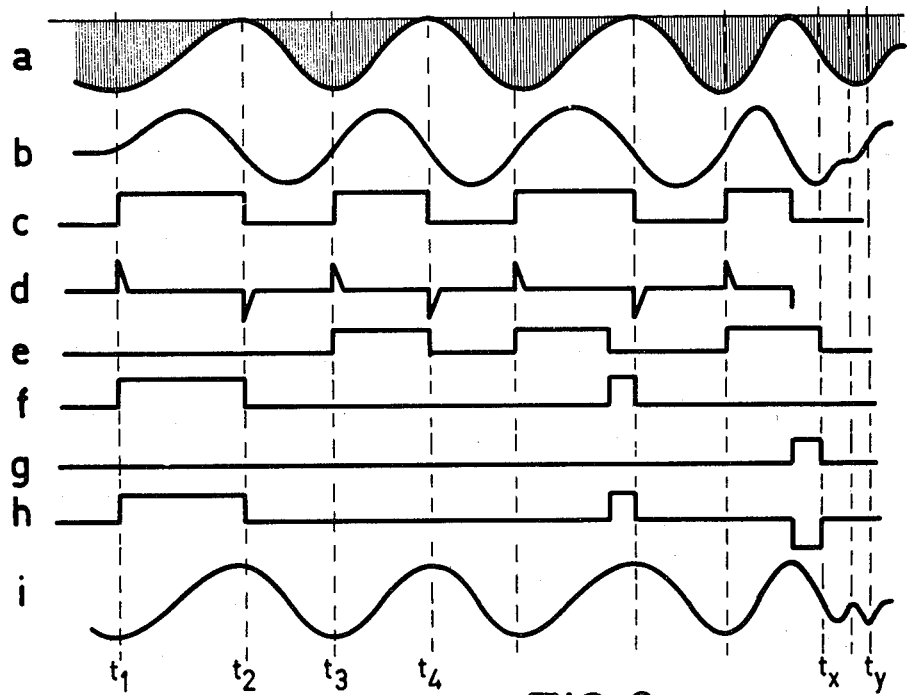

The output of the detector 4 is consequently a high-frequency signal hf, whose amplitude is a maximum (situation $t_1$ in FIG. 1a) when the scanning spot accurately coincides with the track to be scanned, but decreases to zero halfway between two scanning tracks. The outputs of the detectors 5 and 6 are connected in push-pull (schematically represented by a push-pull amplifier 7), which results in a control voltage re as shown in FIG. 2b, which voltage passes through zero both in the correct position $t_1$ of the scanning spot relative to the track and exactly halfway between two tracks.

This control voltage is applied to a control element, for example a linear motor 8, in the usual manner, which element is capable of moving the optical transducer relative to the carrier 1 in a transverse direction.

Figure 3:
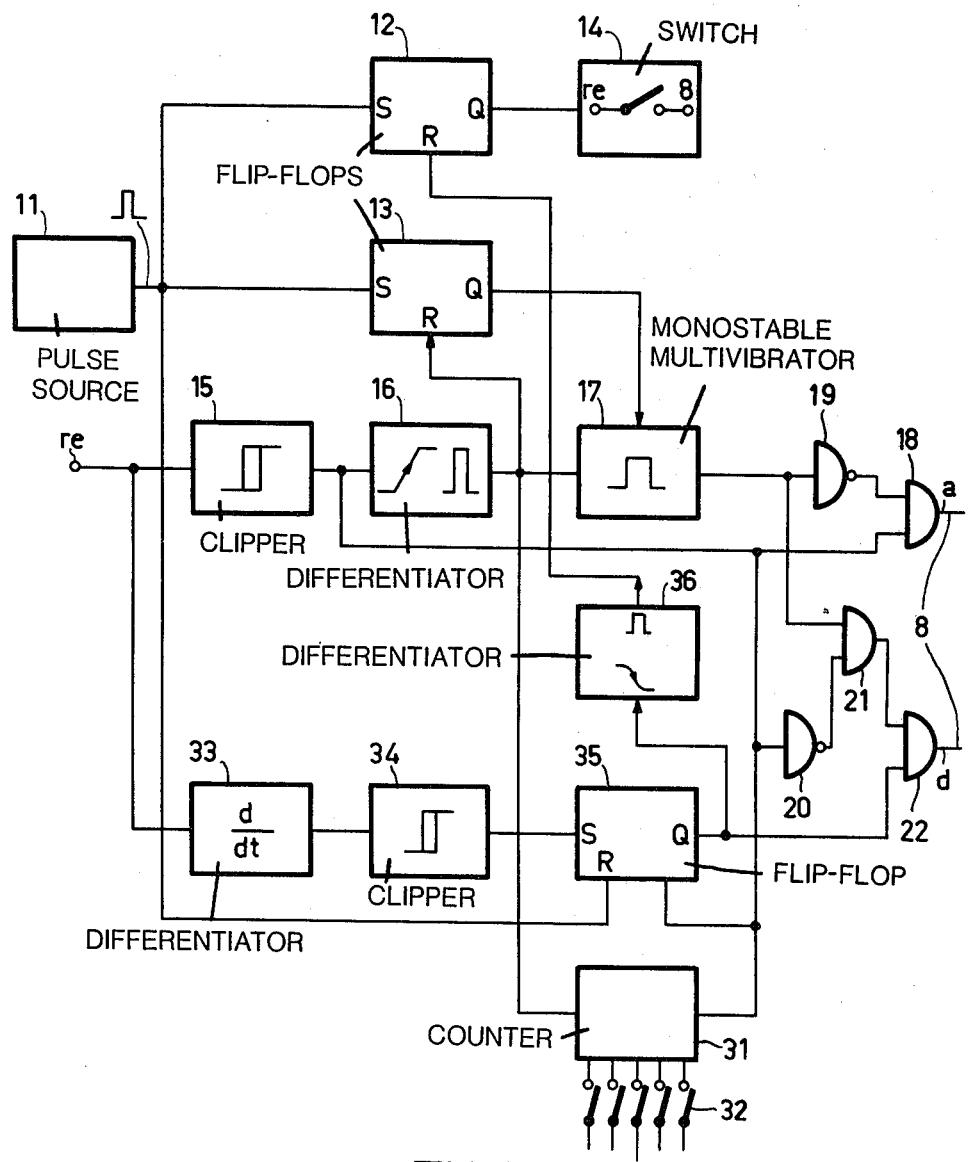
FIG. 3 represents the circuit arrangement employed in the device in accordance with the invention, which is included between the points re and 8 in FIG. 1.

FIG. 3 represents the circuit diagram of the control circuit, which is included between the output of the push-pull detector 5, 6, 7 (point re) and the control element 8 in FIG. 1. The starting command for searching a new desired track is given by means of a pulse source 11. Said starting command can be given manually or may be derived from the information on the carrier 1. The starting pulse from the source 11 triggers the two flip-flops 12 and 13. The flip-flop 12 interrupts the original control loop between points re and 8 in FIG. 1, as is schematically represented by the switch 14 (for example an electronic switch). As a result, the optical transducer can move freely relative to the carrier 1 in a transverse direction. An initial displacement is initiated by a pulse on point "a," which is obtained in a manner to be described hereinafter.

The alternating signal re (FIG. 2b) obtained in accordance with FIG. 1 is applied to a clipper 15, which converts said alternating signal (FIG. 2b) into a square-wave signal in accordance with FIG. 2c. Since the information tracks on the carrier 1 are not exactly parallel and may also exhibit a certain eccentricity relative to the axis of rotation of the motor 2, the pulse durations and the pulse spacings of FIG. 2c will not be equal. Thus, if the switch 14 were switched on again at an arbitrary instant, the requirements to be imposed on the control loop re-8 in order to lock in on the new desired track would be too stringent.

In a differentiator 16 the edges of the squarewave voltage of FIG. 2c are differentiated (FIG. 2d), and the resulting positive pulses then trigger a monostable multivibrator 17 (one shot). Initially the one-shot 17 is inhibited by the output voltage of the flip-flop 13, but after flip-flop 13 has been reset by an output pulse of the differentiator 16, the one-shot 17 is started again. Then it supplies a squarewave voltage in accordance with FIG. 2e, the leading edges of the squarewaves corresponding to pulses of the one (positive) sign of the pulse train of FIG. 2d, whilst the length (duration) of the squarewaves pulses is constant, i.e. is determined by the reset time of the one-shot 17. This squarewave voltage (FIG. 2e), after being inverted in an inverter 19, is applied, to an AND-gate 18 with the output voltage of the clipper 15 (FIG. 2c) in order to provide an accelaration pulse (output a), which via the control means 8, is capable of accelerating the optical transducer in the desired direction. After inversion by inverter 20, the inverted output voltages of the clipper 15 are also applied to an AND gate 21, which also receives the non-inverted output voltage of the one-shot 17, to generate a deceleration pulse which is applied to the control means 8 (output d). (The function of the intermediate AND-gate 22 will be described in more detail hereinafter). Normally the voltages on the outputs "a" and "d" will be combined to a control signal in accordance with FIG. 2h, which is applied to the control means 8.

The function of the flip-flop 13, which keeps the one-shot 17 temporarily inoperative, will now be described with reference to FIG. 2f:

At the instant at which the starting pulse from source 11 renders the control loop re-8 inoperative via the flip-flop 12 and the switch 14, the optical transducer can move freely relative to the information carrier 1. First of all, owing to the eccentricity of the information tracks, which in practice will be several tens of times greater than the spacing between two tracks, the detector 5, 6, 7 will produce an alternating voltage re, which corresponds to the voltage which would be obtained if the optical transducer were moved to and fro over the tracks. The clipper 15 then supplies a voltage in accordance with FIG. 2c, but because the one-shot 17 is initially held inoperative by the output voltage of flip-flop 13, the AND-gate 18 will initially be open, i.e. will supply an acceleration pulse in accordance with the first part $t_1-t_2$ of FIG. 2f. At the instant $t_2$ the differentiator 16 supplies a reset pulse to the flip-flop 13, so that the one-shot 17 can be triggered. Thus, said one-shot is triggered for the first time at the instant $t_3$, at which time the differentiator 16 again supplies a positive pulse, after which from the trailing edges of the square-wave voltage from the stages 15 (FIG. 2c) and 17 (FIG. 2e), via the AND-gates 18 and 21 respectively, either an acceleration pulse (FIG. 2f) or a deceleration pulse (FIG. 2g) is derived for the control means 8, which ensure that the optical transducer has a constant relative velocity relative to the information tracks on the carrier 1.

Figure 4:
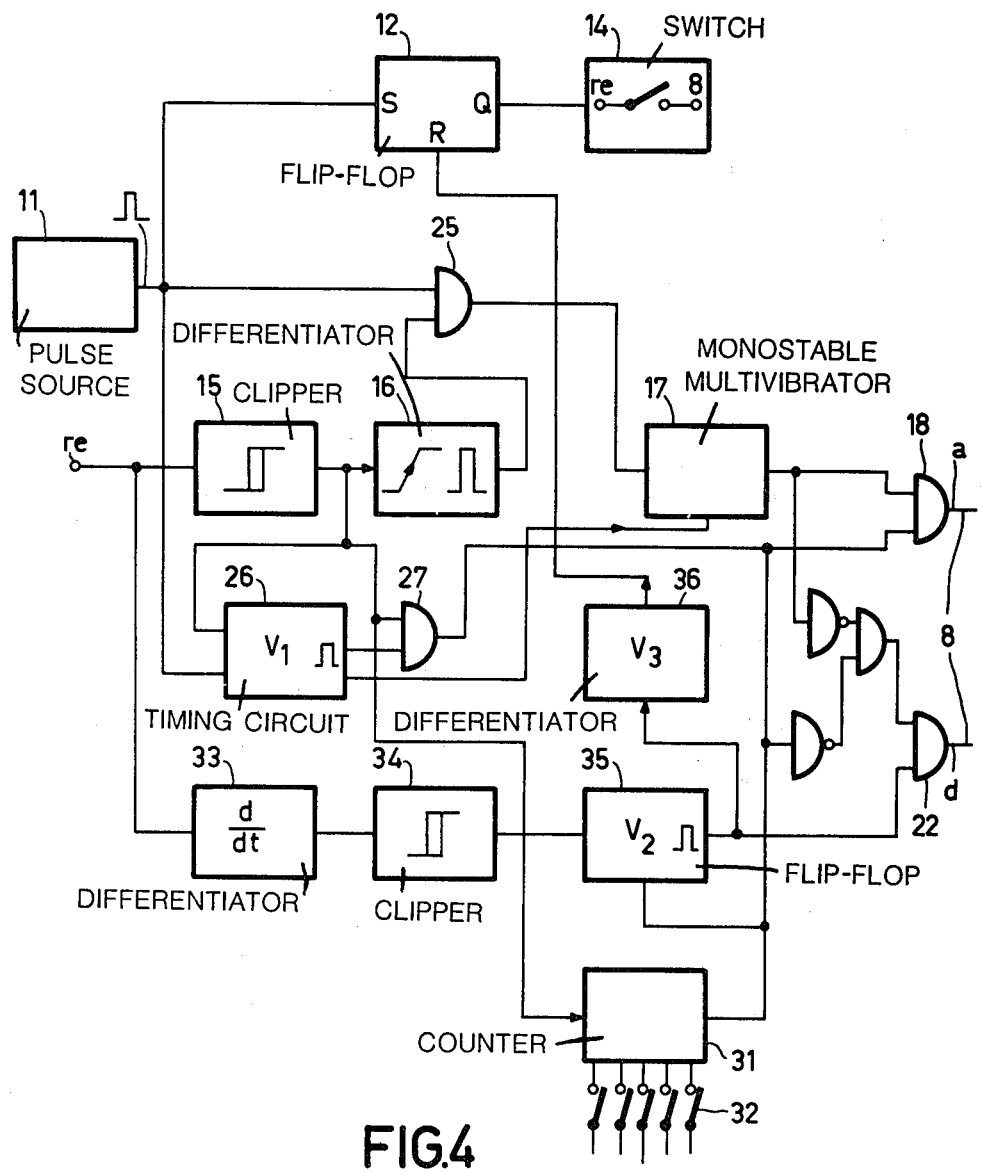
FIG. 4 represents a variant of FIG. 3.

In the variant of FIG. 4 some modifications relative to the device of FIG. 3 are made. From the alternating signal re (FIG. 2b) a squarewave-voltage in accordance with FIG. 2c is derived again by means of the clipper 15, whose edges via the differentiator 16 provide the pulse train in accordance with FIG. 2d. The starting pulse from the source 11, in addition to being applied to the flip-flop 12, by means of which the switch 14 renders the control loop re-8 inoperative, is also applied to an OR-gate 25 and to a timing circuit 26, which lastmentioned circuit also receives the output voltage of the clipper 15. The timing circuit is essentially a flip-flop, connected to a counter which is controlled by clock pulses T, which counter is started at the instant $t_1$ (FIG. 2) and stopped at the instant $t_2$. Starting and stopping can be effected by means of the output pulses of the stages 11 and 15 respectively, as shown.

If desired, stopping is also possible by means of negative output pulses of the stage 16. The measurement value supplied by the timing circuit 26, which is a measure of the duration $t_1-t_2$ of the first pulse of the squarewave voltage on the output of the clipper 15 (FIG. 2c), controls the reset time of the one-shot 17. This measurement value may be generated in the form of a measuring voltage, which is then applied as a bias voltage to an RC circuit of the one-shot 17, which determines the reset time of this one-shot. Said time measurement value may also be rendered available in the form of a counter position, which may be stored in a memory and thus controls the reset time of the one-shot 17, which is reset by means of the same or a further counter which provides said counter position. Further analysis then reveals that $t_1-t_2$ should be twice as long as $t_3-t_4$. This may for example be achieved by having a counter count up from zero with clock pulses T during the time interval $t_1-t_2$ and by subsequently counting down to zero from the count determined during $t_3-t_4$ at a clock pulse frequency which is twice as high. Thus, the reset time $t_3-t_4$ of the monostable 17 becomes exactly half the time $t_1-t_2$ measured by the timing circuit 26. Said time $t_3-t_4$ is then stored in a memory by storing the maximum count and thus constitutes the reference for controlling the optical transducer relative to the further track transitions.

The outputs of the stages 15 and 17 are again applied to a similar gate circuit 18–22 as is described with reference to FIG. 3, with the proviso that now an AND-gate 27 is included between the output of the stage 15 and the gate circuit 18–22.

The device operates as follows: At the instant of the starting pulse from the source 11 the one-shot 17 is triggered and the gate 18 supplies an acceleration pulse to the control element 8 via the output a. At the same time the timing circuit 26 is started and it measures the duration $t_1-t_2$ of the first pulse of the output voltage of the clipper 15 (FIG. 2c). When the instant $t_2$ is reached, the timing circuit 26 supplies a measuring voltage or count, which determines the reset time of the one-shot 17. At the same time the stage 26 enables the AND-gate 27, so that the output voltage of the clipper 15 can now freely reach the gate circuit 18–22, after which a similar comparison of the durations of the voltages of FIG. 2c (output of stage 15) and FIG. 2e (output of stage 17) is effected as described with reference to FIG. 3. The advantage of making the reset time of the one-shot 17 dependent on the duration of the first acceleration pulse on output a is that an adaptation is obtained to the eccentricity of the information carrier 1 and to the distance between the tracks of said carrier, which may vary within certain limits, so that the control system does not respond abruptly. If moreover the said comparison of durations is to be effected at each zero passage of the voltage re (FIG. 2b), polarity-reversal switches may be included in the stages 16, 18 and 22, which reverse the sign of the output pulses upon each change in polarity of the voltage re (FIG. 2b).

The necessary provisions for stopping the control element 8 when the desired track is reached are shown in the lower part of FIGS. 3 and 4 respectively. They comprise a counter 31, which is set to a count (schematically represented by the switches 32) corresponding to the desired number of tracks to be skipped. Counter 31 counts down one step upon each track passage in that its input is connected to the output of the stage 15. When the counter 31 has reached a zero count, a braking pulse should be produced on the output d, which brakes the control system and, at substantially the same time the switch 14, which interrupted the control loop re-8, should be switched on again.

In practice, it is desirable for the braking pulse begin approximately $\frac{1}{4}$ period of the wave shown in FIG. 2b before the zero passage corresponding to the new desired track. For this purpose the output signal re (FIG. 2b) of the detector 5, 6, 7 is applied to a differentiator 33, so that a voltage waveform in accordance with FIG. 2i is obtained. This voltage is again applied via a clipper 34 and a flip-flop 35.

The flip-flop 35 is inhibited by the counter 31, as long as said counter has not yet reached the zero position. If it has, the flip-flop 35 will change over upon the next zero passage $t_x$ of the waveform of FIG. 2i, this is $\frac{1}{4}$ period before the waveform of FIG. 2b passes through zero (instant $t_y$). The output of the flip-flop 35 is applied to an AND-gate 22 and its output d will consequently apply a braking pulse of a duration $t_x-t_y$ to the control element 8. Via a differentiator 36 a reset pulse for the flip-flop 12 is produced, so that the switch 14 is switched on again and the control loop re-8 is rendered operative again.

It will be evident that the invention is equally applicable to a "Compact Disk" and to a "VLP". Application in conjunction with for example magnetic disk storages is also possible, in which case magnetic transducers are employed. In the "Compact Disk" the motor for moving the optical transducer relative to the information carrier will generally not be a linear motor, but said transducer will be mounted on a pivoting arm, so that the movement is no longer purely linear.

The switches shown in FIGS. 3 and 4 are normally of the electronic type, for example of the MOS type.

What is claimed is:

1. A device for controlling the movement of a transducer over a record carrier having a plurality of adjacent information tracks containing information which is converted by the transducer into electrical form, said device comprising control means for moving said transducer relative to the carrier in a direction transverse to the direction of the information tracks, means for applying a starting signal to said control means so that in response thereto said control means moves said transducer over said tracks in said transverse direction, means for producing, during said movement, a periodic signal having a period which depends on the relative transverse velocity of said transducer with respect to said tracks, means for comparing the period of said periodic signal with a predetermined time interval, said comparing means generating a control signal representative of the difference between said period and said predetermined time interval, which control signal is applied to said control means so that in response thereto said transducer is moved by said control means with a constant transverse velocity relative to said tracks, and means for applying a braking signal to said control means just before a desired track is reached in order to enable said transducer to lock on said desired track.

2. The device according to claim 1 including means responsive to said starting signal for producing an acceleration signal which is applied to said control means so that in response thereto said control means moves said transducer in the direction of the desired track.

3. The device according to claim 2 wherein said producing means includes means for detecting deviations of said transducer in said transverse direction relative to a given track, said detecting means producing said alternating signal upon said transverse movement of said transducer over the tracks.

4. The device according to claim 1 wherein said periodic signal is an alternating signal with a frequency which depends on said transverse velocity and said comparing means compares the time interval between two zero passages of said alternating signal and said predetermined time interval so as to generate said control signal which is representative of the difference therebetween.

5. The device according to claims 4 or 3 wherein said comparing means includes a one-shot which is triggered at a time instant corresponding to a zero passage of said alternating signal so as to produce an output pulse of a predetermined duration and a gate circuit responsive to said output pulse and said alternating signal for supplying said control signal of a duration representative of the time interval between the end of said output pulse and a zero crossing of said alternating signal occurring subsequently to the zero crossing which triggers said one shot.

6. The device according to claim 5 including means responsive to said starting signal for generating a command signal upon occurrence of said starting signal and wherein at least one of said one-shot and said gate circuit is responsive to said command signal so that upon occurrence thereof, an acceleration signal is produced in response to which said control means moves said transducer in the direction of the desired track.

7. The device according to claim 5 including means for measuring the time interval between two zero crossings of said alternating signal, said measuring means producing a further signal representative of said difference between said two zero crossings and means for applying said further signal to said one-shot so as to control the duration of said output pulse in dependence thereon.

8. The device according to claim 5 wherein said acceleration signal terminates upon appearance of a zero crossing of said alternating signal and including means for measuring the time interval between said starting signal and the end of said acceleration signal, said measuring means producing a further signal representing said time interval, and means for applying said further signal to said one shot so as to adjust the duration of said output pulse to be equal to one-half of said time interval measured by said measuring means.

9. The device according to claims 1, 2, 3 or 4 including means for counting the tracks passed by said transducer during said transverse movement thereof, and wherein said braking signal applying means is responsive to said counting means.

* * * * *